United States Patent [19]

Convers et al.

[11] 4,287,404
[45] Sep. 1, 1981

[54] ELECTRODE FOR ELECTRICAL DISCHARGE MACHINING

[75] Inventors: Danielle Convers, Geneva; François Balleys, Vernier; Jean Pfau, Geneva, all of Switzerland

[73] Assignee: Ateliers des Charmilles, S.A., Geneva, Switzerland

[21] Appl. No.: 14,927

[22] Filed: Feb. 26, 1979

[30] Foreign Application Priority Data

Mar. 3, 1978 [CH] Switzerland .................. 2317/78
May 5, 1978 [CH] Switzerland .................. 4872/78

[51] Int. Cl.³ .............................................. B23P 1/12
[52] U.S. Cl. ............................... 219/69 W; 219/69 M
[58] Field of Search ............. 219/69 W, 69 E, 69 M; 174/126 CP

[56] References Cited

U.S. PATENT DOCUMENTS

| | | | |
|---|---|---|---|
| 1,896,613 | 2/1933 | Fowle | 174/126 CP |
| 2,526,423 | 10/1950 | Rudorff | 219/69 W |
| 2,906,853 | 9/1959 | Sibley | 219/69 W |
| 2,918,722 | 12/1959 | Kenmore | 174/126 CP |
| 3,256,071 | 6/1966 | Singleton | 174/126 CP |
| 3,433,892 | 3/1969 | Elbindari | 174/126 CP |
| 3,600,981 | 8/1971 | Wagner | 219/69 E X |

Primary Examiner—Gene Z. Rubinson
Assistant Examiner—D. A. Tone
Attorney, Agent, or Firm—Hauke and Patalidis

[57] ABSTRACT

An electrode for machining a workpiece by electrical discharges, the electrode having an active surface comprising at least 50% by weight of a metal or alloy selected from the group consisting of zinc, cadmium, tin, lead, antimony and bismuth. Preferably, the active surface is in the form of a coating electrolytically plated on the surface of a conventional metallic wire having good mechanical characteristics. The invention contemplates continuously plating a metallic filament electrode such as an electrode wire with the active surface coating after the electrode wire has been used for machining a workpiece by EDM.

14 Claims, 2 Drawing Figures

ELECTRODE FOR ELECTRICAL DISCHARGE MACHINING

BACKGROUND OF THE INVENTION

The present invention relates to electrical discharge machining and more particularly to an electrode tool in the form of a continuous metallic filament such as a wire or tape provided with an electroplated surface of particular composition.

The machining efficiency of an electrode tool used for machining a metallic workpiece by electrical discharges is closely related to an appropriate choice of diverse machining parameters, such as for example the machining gap, the machining fluid flow rate, the machining current intensity, the wave form and frequency of the electrical discharges. Although the machining efficiency can be greatly improved by an adaptive adjustment of those machining parameters, it nevertheless reaches a limit which depends upon the galvanic pairs formed by the materials of the electrode tool and of the electrode workpiece.

In addition, the machining efficiency of a metallic filament such as a wire or tape used as an electrode tool for cutting a workpiece by electrical discharges is dependent to a great degree on the current density which the wire or tape is capable of accepting. The machining accuracy depends upon the accuracy of alignment of the wire electrode between its guiding and support members while being translated through the machining zone. The alignment of the wire electrode tool is influenced by the traction or pull exerted on the wire, with the result that the wire must be capable of being subjected to a high current density as well as being endowed with a high mechanical strength under traction. Such requirements are uncompatible when they are applied to conventional metallic wires because materials which are good conductors of electrical current have a very poor mechanical strength The present invention permits a filament electrode such as a wire electrode to be obtained for EDM which satisfies both conditions of high electrical efficiency and high mechanical strength. In addition, the invention has for an object to provide an electrode which greatly facilitates the triggering of the electrical discharges and which decreases any tendency to cause short circuits, with the result that the wire electrode of the invention enables machining at higher speeds than is the case with conventional wire electrodes.

A filament electrode such as a wire electrode according to the present invention is characterized by being provided with an active surface comprising at least 50% by weight of one or more of the following metals: zinc, cadmium, tin, lead, antimony and bismuth.

The active surface of the wire electrode consists of a coating protecting the core of the wire against thermal shocks caused by the electrical discharges resulting from the low temperature of vaporization of the above-mentioned metals. For all practical purposes, the active surface coating provides a thermal shield for the wire which in turn permits an increase in the power of the electrical discharges or their frequency without risking rupturing the wire electrode in the machining zone.

The surface coating may have a thickness in the range of 1 to 25 microns according to the intensity and direction of the electrical discharges. The coating may further consist, for example, of at least 80% cadmium, which presents the further advantage of considerably reducing the coefficient of friction relative to the wire guiding surfaces, and of greatly facilitating cold sizing of the wire.

The mechanical strength of the wire and the intensity of the current flow through the wire can further be greatly increased by providing a wire having a steel core surrounded by a layer of copper or silver provided in turn by the protective thermal coating consisting of, for example, zinc, cadmium, tin, lead, antimony or bismuth, or alloys thereof.

A further advantage derived from providing a wire electrode with a surface coating according to the invention is to be able to convert into machining discharges the discharges occurring during a short circuit, because the metallic bridges formed in the machining gap between the wire electrode and the workpiece are very easily melted by the heat generated by the high intensity current of the short circuit. Metals having low inherent vaporization heat characteristics are therefore more particularly advantageous for such an application.

The present invention is addressed to a method and to an apparatus for manufacturing the electrode of the invention.

BRIEF DESCRIPTION OF THE DRAWING

The present invention will be better understood by those skilled in the art after reading the following description of the best modes contemplated for practicing the invention with reference to the accompanying drawing wherein.

DETAILED DESCRIPTION OF THE PREFERRED EMBODIMENTS

Figure 1:
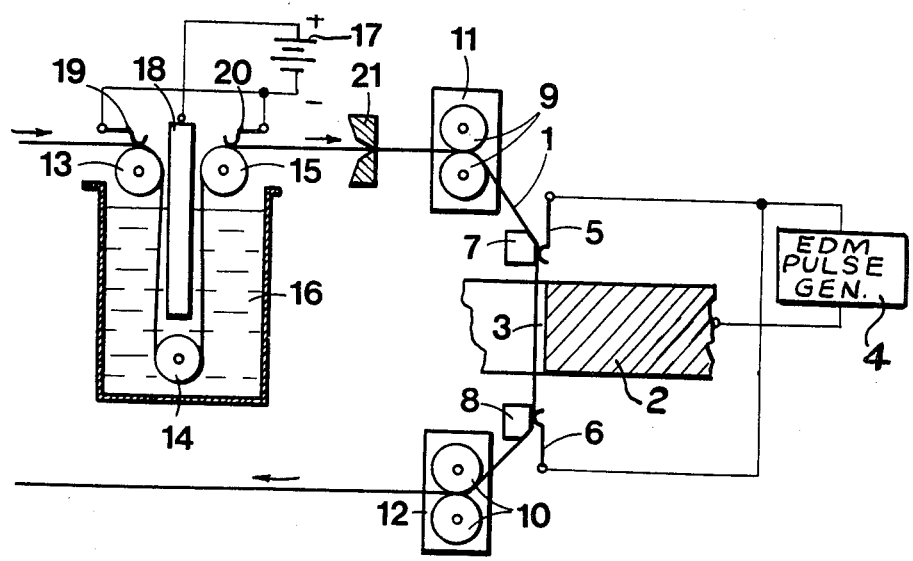
FIG. 1 illustrates in a schematic manner an example of structure for making an electrode according to the present invention.

Referring first to FIG. 1, a metallic filament electrode tool 1 in the form of a wire, for example, is shown schematically while being used for cutting a workpiece 2 according to a predetermined path controlled by a copying device or a numerical control, not shown in the drawing. Electrical discharge machining is effected on the workpiece 2 through a machining zone 3 located between the wire 1 and the workpiece 2. Electrical discharge machining (EDM) is effected as a result of consecutive electrical pulses being supplied by a generator 4 having one of its terminals connected to the workpiece 2 and its other terminal connected to the wire 1 through contact brushes 5 and 6.

The wire electrode 1 is held in a predetermined position with respect to the workpiece 2 by means of a pair of guides 7 and 8 relative to which the wire 1 is longitudinally displaced while being maintained under tension by the pinch roller pairs 9 and 10 driven respectively by motors 11 and 12.

Prior to reaching the machining zone 3, the wire 1 is driven by pulleys or rollers 13, 14, and 15 through a tank 16 containing an electrolytic bath and in which one or more of the above-mentioned metals is electrolytically deposited on the surface of the wire, electrical current for the electrolytic plating process being supplied from a direct current source 17. The direct current source is connected with the polarity indicated in the drawing across a graphite electrode 18 immersed in the electrolytic bath and the wire 1, contact with the wire 1 being effected by means of contact brushes 19 and 20. The length of the path and the speed of translation of the wire 1 through the tank 16 are arranged to provide a coating of metal electroplated on the wire having a thickness of about 15 microns, for example. The wire 1 is subsequently sized by extrusion through a die 21 prior to reaching the machining zone 3.

Preferably, the machining parameters are adjusted to cause the wear of the wire to be substantially limited to its surface coating. Under those conditions, it is possible to use continuously the same length of wire after passage through the machining zone 3 because, after having been re-plated through the electrolytic bath tank 16, the wire is drawn through the die 21 for re-sizing prior to feeding the wire through the machining zone 3. In addition to permitting continuous use of the same length of wire in a closed loop, the apparatus of the invention permits the utilization of a spool of wire having been previously used in an EDM cutting operation.

Figure 2:
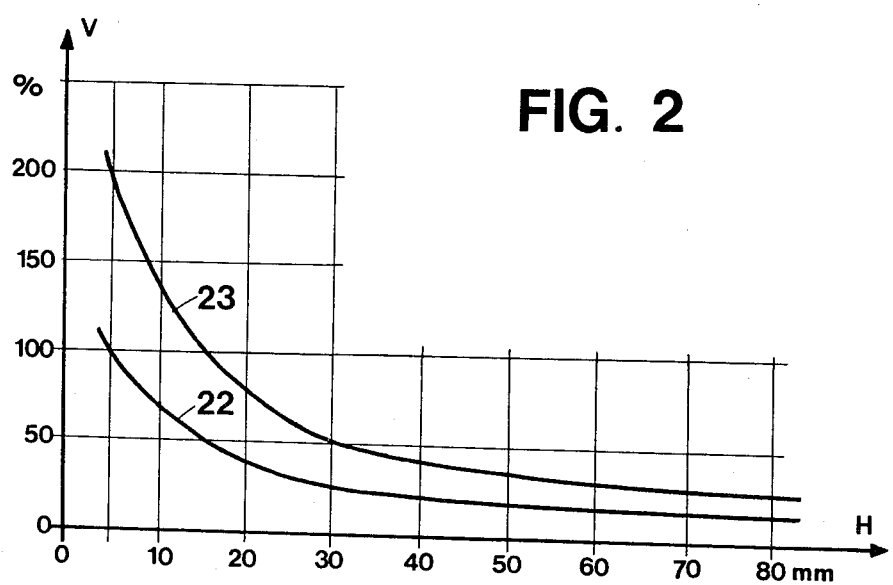
FIG. 2 is a graph useful in interpreting the results achieved by the apparatus of FIG. 1.

FIG. 2 graphically illustrates the results achieved with the apparatus of FIG. 1. Curve 22 represents the relative cut velocity V of a brass wire electrode of 180 microns in diameter as a function of the height H of a workpiece. Curve 23 illustrates the results achieved on the same EDM machine using a copper wire electrode of the same diameter plated with a zinc coating of about 15 micron thickness.

Results slightly inferior to those illustrated with respect to material removal rate have been achieved with a galvanized steel wire of 200 microns in diameter.

It will be appreciated that the zinc coating on the wire electrode need not be effected simultaneously with machining of the workpiece, and that other means than those described and illustrated could be used for obtaining a wire electrode having an active surface consisting of an alloy containing at least 50% by weight of zinc.

It will also be appreciated that the wire electrode need not be provided with a coating of an alloy rich in zinc, but that the coating can consist of another metal having a low vaporization temperature. In addition to zinc, such metals may be cadmium, tin, lead, antimony or bismuth, either alone or in combination or as alloys. When machining is effected by conventional EDM methods and apparatus by means of a shaping massive electrode, the mechanical stress imposed upon the electrode tool is much less than the mechanical stress imposed on the wire electrode EDM machines. It is thus possible to use shaping electrodes made of an alloy containing a large proportion of zinc, even though the mechanical strength of those electrodes is relatively low.

In order to achieve the best machining performance, the wire electrode must have a good electrical conductance, in order to enable a high machining current to flow through the electrode, coupled with a high mechanical strength permitting use of an increased traction force through the machining zone. If it is desired to place the emphasis on the machining velocity, the coating of zinc or other metal is plated on a copper or brass wire but, on the other hand, if it is desired to obtain a wire electrode having maximum strength and rigidity, the coating is plated on the surface of a steel wire. A desirable compromise is obtained by electroplating a steel wire with a coating of copper or silver in a first electrolytic bath followed by plating a coating of zinc, cadmium, tin, lead, antimony, bismuth or alloys thereof, on the copper or silver subjacent high conductance coating in a second electrolytic bath.

Having thus described the invention by way of a practical example of application thereof, modification whereof will be apparent to those skilled in the art, what is claimed as new is as follows:

We claim:

1. In combination with an EDM apparatus, a filament electrode for electrical discharge machining of a workpiece wherein said filament electrode is displaced longitudinally and laterally through the workpiece, said filament electrode comprising a core made of material having a relatively high mechanical strength and a relatively thin metallic surface coating on said core, said metallic surface coating comprising at least 50% of a metal having a low temperature of vaporization selected from the group consisting of zinc, cadmium, tin, lead, antimony, bismuth and an alloy thereof.

2. In combination with an EDM apparatus, a filament electrode for electrical discharge machining of a workpiece wherein said filament electrode is displaced longitudinally and laterally through the workpiece, said filament electrode comprising a core made of material having a relatively high mechanical strength and a relatively thin metallic surface coating on said core, said metallic surface coating comprising at least 50% of a metal having a low temperature of vaporization selected from the group consisting of zinc, cadmium, tin, lead, antimony, bismuth and an alloy thereof, wherein the core of said filament electrode is metallic and is selected from the group consisting of copper, brass and steel.

3. The combination of claim 2 wherein said metallic surface coating is placed on a subjacent coating made of a material having a high electrical conductance, said subjacent coating surrounding said core.

4. The combination of claim 3 wherein said subjacent coating and said metallic surface coating are electrolytically deposited.

5. The combination of claim 2 wherein said metallic surface coating is electrolytically deposited.

6. A process for EDM machining, said process comprising electroplating on a metallic filament a relatively thin surface coating containing at least 50% of a metal having a low temperature of vaporization selected from the group consisting of zinc, cadmium, tin, lead, antimony, bismuth, and an alloy thereof by passing said metallic filament through an electrolytic bath for plating said metallic filament with said surface coating, and subsequently passing said coated filament through the machining zone of an EDM apparatus.

7. The process of claim 6 wherein said metallic filament is a metallic wire.

8. The process of claim 7 further comprising sizing said coated wire through a die after passing said wire through said electrolytic bath.

9. The process of claim 8 wherein said wire is a single loop of wire passed through said electrolytic bath after being passed through said machining zone.

10. The process of claim 6 wherein said filament is a single loop of wire passed through said electrolytic bath after being passed through said machining zone.

11. A process for the manufacture of a wire electrode for electrical discharge machining comprising passing a metallic wire through an electroplating bath for electroplating on said metallic wire a surface coating containing at least 50% of a metal selected from the group consisting of zinc, cadmium, tin, lead, antimony, bismuth and an alloy thereof, wherein said electroplating is effected in an EDM apparatus by passing said wire through said electroplating bath before passing said wire through a machining zone between said wire and a workpiece.

12. The process of claim 11 wherein said wire is passed through a sizing die after passing through said electroplating bath and before passing through said machining zone.

13. An EDM apparatus comprising a wire electrode, a workpiece-electrode, means for passing the wire electrode through an electroplating bath for forming a surface coating on said wire electrode containing at least 50% of a metal selected from the group consisting of zinc, cadmium, tin, lead, antimony, bismuth and an alloy thereof, means for guiding said electroplated wire electrode through a machining zone between said wire electrode and the workpiece electrode and means for feeding said wire electrode after passing through the machining zone through said electroplating bath for replating on said wire electrode surface coating removed in the course of passage through the machining zone.

14. An EDM apparatus comprising a wire electrode, a workpiece-electrode, means for passing the wire electrode through an electroplating bath for forming a surface coating on said wire electrode containing at least 50% of a metal selected from the group consisting of zinc, cadmium, tin, lead, antimony, bismuth and an alloy thereof, means for guiding said electroplated wire electrode through a machining zone between said wire electrode and the workpiece electrode, means for feeding said wire electrode after passage through the machining zone through said electroplating bath for replating on said wire electrode surface coating removed in the course of passage through the machining zone, and means for sizing said wire electrode after passage through said electroplating bath and before passage through said machining zone.

* * * * *

UNITED STATES PATENT AND TRADEMARK OFFICE
CERTIFICATE OF CORRECTION

PATENT NO. : 4,287,404
DATED : September 1, 1981
INVENTOR(S) : Danielle Convers et al It is certified that error appears in the above-identified patent and that said Letters Patent are hereby corrected as shown below:

Column 5, line 17, change "passing" to --passage--.

Signed and Sealed this

Nineteenth Day of January 1982

[SEAL]

Attest:

Attesting Officer

GERALD J. MOSSINGHOFF

*Commissioner of Patents and Trademarks*

REEXAMINATION CERTIFICATE (358th)
United States Patent [19]
Convers et al.

[11] B1 4,287,404
[45] Certificate Issued Jun. 11, 1985

[54] ELECTRODE FOR ELECTRICAL DISCHARGE MACHINING

[75] Inventors: Danielle Convers, Geneva; Francois Balleys, Vernier; Jean Pfau, Geneva, all of Switzerland

[73] Assignee: Ateliers des Charmilles, S.A., Geneva, Switzerland

Reexamination Request:
No. 90/000,485, Jan. 6, 1984

Reexamination Certificate for:
Patent No.: 4,287,404
Issued: Sep. 1, 1984
Appl. No.: 14,927
Filed: Feb. 26, 1979

Certificate of Correction issued Jan. 19, 1982.

[30] Foreign Application Priority Data

Mar. 3, 1978 [CH] Switzerland ............ 2317/78
May 5, 1978 [CH] Switzerland ............ 4872/78

[51] Int. Cl.³ .................................... B23P 1/12
[52] U.S. Cl. ............................ 219/69 W; 219/69 E; 219/69 M
[58] Field of Search ............ 219/69 E, 69 M, 69 R, 219/68, 69 W, 118, 69 G; 204/206, 207, 224 M

[56] References Cited
FOREIGN PATENT DOCUMENTS

| | | |
|---|---|---|
| 839082 | 7/1976 | Belgium . |
| 2806470 | of 0000 | Fed. Rep. of Germany . |
| 2009335 | 7/1971 | France . |
| 38-26049 | 12/1963 | Japan . |
| 29-20500 | 9/1964 | Japan . |
| 40-9360 | 5/1965 | Japan . |
| 44-2280 | 1/1969 | Japan . |
| 44-24480 | 10/1969 | Japan . |
| 47-20797 | 9/1972 | Japan . |
| 50-102999 | 8/1975 | Japan . |
| 51-111997 | 10/1976 | Japan . |
| 52-136495 | 11/1977 | Japan . |
| 55-27810 | 7/1980 | Japan . |
| 363054 | 12/1931 | United Kingdom . |
| 762378 | 11/1956 | United Kingdom . |
| 896335 | 5/1962 | United Kingdom . |
| 898543 | 6/1962 | United Kingdom . |
| 1067795 | 5/1967 | United Kingdom . |
| 1185831 | 3/1970 | United Kingdom . |
| 1260962 | 1/1972 | United Kingdom . |
| 1327945 | 8/1973 | United Kingdom . |
| 1443656 | 7/1976 | United Kingdom . |

OTHER PUBLICATIONS

Machinery, Feb., 1966, pp. 153-154, S. Spizig, pp. 50-51.
Draht, 1975/5, pp. 238-243.

*Primary Examiner*—M. H. Paschall

[57] ABSTRACT

An electrode for machining a workpiece by electrical discharges, the electrode having an active surface comprising at least 50% by weight of a metal or alloy selected from the group consisting of zinc, cadmium, [tin,] lead, antimony and bismuth. Preferably, the active surface is in the form of a coating electrolytically plated on the surface of a conventional metallic wire having good mechanical characteristics. The invention contemplates continuously plating a metallic filament electrode such as an electrode wire with the active surface coating after the electrode wire has been used for machining a workpiece by EDM.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 50–54:

A filament electrode such as a wire electrode according to the present invention is characterized by being provided with an active surface comprising at least 50% by weight of one or more of the following metals: zinc, cadmium, [tin,] lead, antimony and bismuth.

Column 2, lines 4–10:

The mechanical strength of the wire and the intensity of the current flow through the wire can further be greatly increased by providing a wire having a steel core surrounded by a layer of copper or silver provided in turn by the protective thermal coating consisting of, for example, zinc, cadmium, [tin,] lead, antimony or bismuth, or alloys thereof.

Column 3, lines 37–68:

It will also be appreciated that the wire electrode need not be provided with a coating of an alloy rich in zinc, but that the coating can consist of another metal having a low vaporization temperature. In addition to zinc, such metals may be cadmium, [tin,] lead, antimony or bismuth, either alone or in combination as alloys. When machining is effected by conventional EDM methods and apparatus by means of a shaping massive electrode, the mechanical stress imposed upon the electrode tool is much less than the mechanical stress imposed on the wire electrode *of wire electrode* EDM machines. It is thus possible to use shaping electrodes made of an alloy containing a large proportion of zinc, even though the mechanical strength of those electrodes is relatively low.

In order to achieve the best machining performance, the wire electrode must have a good electrical conductance, in order to enable a high machining current to flow through the electrode, coupled with a high mechanical strength permitting use of an increased traction force through the machining zone. If it is desired to place the emphasis on the machining velocity, the coating of zinc or other metal is plated on a copper or brass wire but, on the other hand, if it is desired to obtain a wire electrode having maximum strength and rigidity, the coating is plated on the surface of a steel wire. A desirable compromise is obtained by electroplating a steel wire with a coating of copper or silver in a first electrolytic bath followed by plating a coating of zinc, cadmium, [tin,] lead, antimony[,] *or* bismuth, or alloys thereof, on the copper or silver subjacent high conductance coating in a second electrolytic bath.

AS A RESULT OF REEXAMINATION, IT HAS BEEN DETERMINED THAT:

Claim 7 is cancelled.

Claims 1–3, 6, 8–11, 13 and 14 are determined to be patentable as amended.

Claims 4, 5, and 12, dependent on an amended claim, are determined to be patentable.

1. In combination with an EDM apparatus, a *wire* [filament] electrode for electrical discharge [machining] *cutting* of a workpiece wherein said *wire* [filament] electrode is *continuously moving* [displaced] longitudinally *in a single direction* and *is displaced* laterally through the workpiece *during cutting of the workpiece*, said *wire* [filament] electrode comprising a core made of material having a relativey high mechanical strength and a relatively thin metallic surface coating on said core, said metallic surface coating comprising at least 50% of a metal having a low temperature of vaporization selected from the group consisting of zinc, cadmium, [tin,] lead, antimony, bismuth and an alloy thereof, *wherein said wire electrode is continuously supplied to a machining zone formed between a lateral surface of said wire electrode and said workpiece during cutting of said workpiece*.

2. In combination with an EDM apparatus, a *wire* [filament] electrode for electrical discharge [machining] *cutting* of a workpiece wherein said *wire* [filament] electrode is *continuously moving* [displaced] longitudinally *in a single direction for supplying said wire electrode to a machining zone formed between said wire electrode and said workpiece* and *said electrode wire is displaced* laterally through the workpiece *during cutting of the workpiece*, said *wire* [filament] electrode comprising a core made of material having a relatively high mechanical strength and a relatively thin metallic surface coating on said core, said metallic surface coating comprising at least 50% of a metal having a low temperature of vaporization selected from the group consisting of zinc, cadmium, [tin,] lead, antimony, bismuth and an alloy thereof, wherein the core of said *wire* [filament] electrode is metallic and is selected from the group consisting of copper, brass and steel.

3. The combination of claim 2 wherein said metallic surface coating is placed on a subjacent coating *different from said metallic surface coating and* made of a material having a high electrical conductance, said subjacent coating surrounding said core.

6. A process for EDM machining, said process comprising electroplating on a *continuously moving* metallic *wire* [filament] a relatively thin surface coating *of the order of 1 to 25 microns in thickness and* containing at least 50% of a metal having a low temperature of vaporization selected from the group consisting of zinc, cadmium, [tin,] lead, antimony, bismuth, and an alloy thereof by passing said metallic *wire*[filament] through an electrolytic bath for plating said metallic *wire* [filament] with said surface coating, and subsequently passing said coated *wire* [filament] through [the] *a* workpiece machining zone [of] *in* an EDM apparatus *for effecting a lateral cut in the workpiece by lateral displacement of said coated wire through the workpiece and continuous longitudinal motion in a single direction of said coated wire through the machining zone for continuously*

*supplying said wire with a renewed coating to the machining zone.*

8. The process of claim [7] *6* further comprising sizing said coated wire through a die after passing said wire through said electrolytic bath.

9. *A process for EDM machining, said process comprising electroplating on a metallic filament a relatively thin surface coating containing at least 50% of a metal having a low temperature of vaporization selected from the group consisting of zinc, cadmium, lead, antimony, bismuth, and an alloy thereof by passing said metallic filament through an electrolytic bath for plating said metallic filament with said surface coating, sizing said coated wire through a die after passing said wire through said electrolytic bath, and subsequently passing said coated filament through the machining zone of an EDM apparatus, wherein said metallic filament is a metallic wire, and* [The process of claim 8 wherein] said wire is a single loop of wire passed through said electrolytic bath after being passed through said machining zone.

10. *A process for EDM machining, said process comprising electroplating on a metallic filament a relatively thin surface coating containing at least 50% of a metal having a low temperature of vaporization selected from the group consisting of zinc, cadmium, tin, lead, antimony, bismuth, and an alloy thereof by passing said metallic filament through an electrolytic bath for plating said metallic filament with said surface coating, and subsequently passing said coated filament through the machining zone of an EDM apparatus,* [The process of claim 6] wherein said filament is a single loop of wire passed through said electrolytic bath after being passed through said machining zone.

11. A process for the manufacture of a wire electrode for electrical discharge [machining] *cutting of a workpiece in a machining zone between the wire electrode and the workpiece wherein the wire electrode is continuously supplied to the machining zone by being displaced longitudinally and effectuates a cut in the workpiece by lateral motion into the workpiece, said process* comprising passing a metallic wire through an electroplating bath *in a single longitudinal direction* for electroplating on said metallic wire a surface coating containing at least 50% of a metal selected from the group consisting of zinc, cadmium, [tin,] lead, antimony, bismuth and an alloy thereof, wherein said electroplating is effected in an EDM apparatus by passing said *metallic* wire through said electroplating bath before passing said *metallic* wire through [a] *the* machining zone between said *metallic* wire and *said* [a] workpiece.

13. An EDM apparatus comprising a wire electrode, a [workpiece-electrode] *workpiece electrode*, means for passing the wire electrode through an electroplating bath for forming a surface coating on said wire electrode containing at least 50% of a metal selected from the group consisting of zinc, cadmium, [tin,] lead, antimony, bismuth and an alloy thereof, means for guiding said electroplated wire electrode through a machining zone between said wire electrode and the workpiece electrode and means for feeding said wire electrode after *passage* [passing] through the machining zone through said electroplating bath for replating on said wire electrode surface coating removed in the course of passage through the machining zone.

14. An EDM apparatus comprising a wire electrode, a [workpiece-electrode] *workpiece electrode*, means for passing the wire electrode through an electroplating bath for forming a surface coating on said wire electrode containing at least 50% of a metal selected from the group consisting of zinc, cadmium, [tin,] lead, antimony, bismuth and an alloy thereof, means for guiding said electroplated wire electrode through a machining zone between said wire electrode and the workpiece electrode, means for feeding said wire electrode after passage through the machining zone through said electroplating bath for replating on said wire electrode surface coating removed in the course of passage through the machining zone, and means for sizing said wire electrode after passage through said electroplating bath and before passage through said machining zone.

* * * * *